United States Patent
Massara et al.

(10) Patent No.: US 7,011,369 B2
(45) Date of Patent: Mar. 14, 2006

(54) INTEGRATED ADJUSTABLE LUMBAR SUPPORT AND TRIM ATTACHMENT SYSTEM

(75) Inventors: Andrew J. Massara, Birmingham, MI (US); Brandon R. Vogt, Northville, MI (US)

(73) Assignee: Alfmeier Corporation, Troy, MI (US)

( * ) Notice: Subject to any disclaimer, the term of this patent is extended or adjusted under 35 U.S.C. 154(b) by 0 days.

(21) Appl. No.: 10/483,131

(22) PCT Filed: Jul. 11, 2002

(86) PCT No.: PCT/US02/22440

§ 371 (c)(1),
(2), (4) Date: Jan. 8, 2004

(87) PCT Pub. No.: WO03/005859

PCT Pub. Date: Jan. 23, 2003

(65) Prior Publication Data

US 2005/0023873 A1  Feb. 3, 2005

Related U.S. Application Data

(60) Provisional application No. 60/304,504, filed on Jul. 11, 2001.

(51) Int. Cl.
*B60N 2/66* (2006.01)

(52) U.S. Cl. .................. 297/284.4; 297/284.1

(58) Field of Classification Search ............ 297/284.1, 297/284.3, 284.4
See application file for complete search history.

(56) References Cited

U.S. PATENT DOCUMENTS

| 134,853 | A |   | 1/1873  | Cliff          |
| 162,165 | A |   | 4/1875  | Godley         |
| 759,507 | A |   | 5/1904  | Ericson et al. |
| 1,153,058 | A |   | 9/1915  | Gilfillan      |
| 1,273,953 | A |   | 7/1918  | Torano         |
| 2,812,804 | A |   | 11/1957 | Sandor         |
| 2,903,043 | A |   | 9/1959  | Kenney         |
| 3,145,054 | A |   | 8/1964  | Sopko          |

(Continued)

FOREIGN PATENT DOCUMENTS

| EP | 582821 A1 | * | 2/1994 |
| GB | 1365348 A | * | 9/1974 |

*Primary Examiner*—Peter M. Cuomo
*Assistant Examiner*—Stephen D'Adamo
(74) *Attorney, Agent, or Firm*—Pitts & Brittian, P.C.

(57) ABSTRACT

An adjustable lumbar support (10) adapted to be integrated into new or existing seat structures. Adjustable lumbar support (10) includes a floating plate (15) supported by a support linkage. In one embodiment, the support linkage is defined by first and second spring members (25) and (26) which engage the seat frame. In an alternate embodiment, the support linkage is defined by first and second spring members (25) and (26) engaged with first and second linkage members (52), respectively, and includes a rotary power mechanism (50) for applying a rotating motion to a shaft (54) threadably engaged with first and second linkage members (52). The degree of support provided by floating plate (15) is adjusted by adjusting the effective length of the support linkage. Lumbar support mechanism (10) can be mounted in a seat back alone or in conjunction with an integral trim attachment array (70). Trim attachment array (70) is adapted to replace the trim wires molded into the cushion foam of a standard seat.

11 Claims, 8 Drawing Sheets

U.S. PATENT DOCUMENTS

| | | |
|---|---|---|
| 3,348,880 A | 10/1967 | Swann |
| 3,581,322 A | 6/1971 | Marsico |
| 3,899,210 A | 8/1975 | Samhammer et al. |
| 3,974,827 A | 8/1976 | Bodeen |
| 4,108,492 A | 8/1978 | Kirby |
| 4,138,235 A | 2/1979 | Turner |
| 4,276,666 A | 7/1981 | Yamada |
| 4,357,725 A | 11/1982 | Ahlm |
| 4,400,817 A | 8/1983 | Sumner |
| 4,452,485 A | 6/1984 | Schuster |
| 4,490,866 A | 1/1985 | Stanton |
| 4,497,517 A | 2/1985 | Gmeiner et al. |
| 4,516,568 A | 5/1985 | Baxter et al. |
| 4,539,057 A | 9/1985 | Ahlm |
| 4,554,693 A | 11/1985 | Calloway |
| 4,555,140 A | 11/1985 | Nemoto |
| 4,564,235 A | 1/1986 | Hatsutta et al. |
| 4,567,615 A | 2/1986 | Fanti |
| 4,577,358 A | 3/1986 | Glass |
| 4,607,403 A | 8/1986 | Alivizatos |
| 4,619,481 A | 10/1986 | Grudzinskas |
| 4,629,253 A | 12/1986 | Williams |
| 4,634,176 A | 1/1987 | Scott |
| 4,636,000 A * | 1/1987 | Nishino .................. 297/284.9 |
| 4,706,313 A | 11/1987 | Murphy |
| 4,720,146 A | 1/1988 | Mawbey et al. |
| 4,725,095 A | 2/1988 | Benson et al. |
| 4,736,587 A | 4/1988 | Suzuki |
| 4,754,511 A | 7/1988 | Sargent |
| 4,757,564 A | 7/1988 | Goodale |
| 4,775,185 A | 10/1988 | Scholin et al. |
| 4,789,202 A | 12/1988 | Alter |
| 4,809,375 A | 3/1989 | Bull |
| 4,819,278 A | 4/1989 | Ramos |
| 4,862,536 A | 9/1989 | Pruit |
| 4,880,271 A | 11/1989 | Graves |
| 4,924,541 A | 5/1990 | Inagaki |
| 4,932,429 A | 6/1990 | Watanabe et al. |
| 4,955,666 A | 9/1990 | Baker |
| 4,973,024 A | 11/1990 | Homma |
| 4,979,672 A | 12/1990 | AbuJudom, II et al. |
| 5,050,930 A | 9/1991 | Schuster et al. |
| 5,076,643 A | 12/1991 | Colasanti et al. |
| 5,079,787 A | 1/1992 | Pollman |
| 5,103,517 A | 4/1992 | Krouskop |
| 5,111,544 A | 5/1992 | Graebe |
| 5,127,119 A | 7/1992 | Rogers |
| 5,129,707 A * | 7/1992 | Yamauchi .............. 297/216.14 |
| 5,174,526 A | 12/1992 | Kanigowski |
| 5,190,348 A | 3/1993 | Colasanti |
| 5,197,780 A | 3/1993 | Coughlin |
| 5,211,371 A | 5/1993 | Coffee |
| 5,279,237 A | 1/1994 | Alivizatos |
| 5,317,768 A | 6/1994 | Klancnik |
| 5,319,814 A | 6/1994 | Dyer, Jr. |
| 5,325,880 A | 7/1994 | Johnson et al. |
| 5,345,963 A | 9/1994 | Dietiker |
| 5,397,164 A | 3/1995 | Schuster et al. |
| 5,462,335 A | 10/1995 | Seyler |
| 5,474,358 A | 12/1995 | Maeyaert |
| 5,491,854 A | 2/1996 | Music |
| 5,498,063 A | 3/1996 | Schuster et al. |
| 5,505,520 A | 4/1996 | Frusti et al. |
| 5,513,402 A | 5/1996 | Schwartz |
| 5,567,011 A | 10/1996 | Sessini |
| 5,573,302 A | 11/1996 | Harrison et al. |
| 5,609,394 A | 3/1997 | Ligon, Sr. et al. |
| 5,649,739 A | 7/1997 | Zapf |
| 5,651,584 A | 7/1997 | Chenot et al. |
| D383,928 S | 9/1997 | Earleywine, Jr. |
| 5,680,662 A | 10/1997 | Purdy et al. |
| 5,733,012 A | 3/1998 | Jones |
| 5,802,643 A | 9/1998 | Sloot |
| 5,802,646 A | 9/1998 | Stolpmann et al. |
| 5,806,927 A | 9/1998 | Schneider |
| 5,823,620 A | 10/1998 | Le Caz |
| 5,836,647 A | 11/1998 | Turman |
| 5,910,081 A | 6/1999 | Graham |
| 5,911,477 A | 6/1999 | Mundell et al. |
| 5,913,569 A | 6/1999 | Klingler |
| 5,937,464 A | 8/1999 | Niederman |
| 5,967,608 A | 10/1999 | Van Sickle |
| 6,003,941 A | 12/1999 | Schuster, Sr. et al. |
| 6,045,185 A | 4/2000 | Ligon, Sr. et al. |
| 6,053,064 A | 4/2000 | Gowing et al. |
| 6,092,871 A | 7/2000 | Beaulieu |
| 6,152,531 A | 11/2000 | Deceuninck |
| 6,227,617 B1 | 5/2001 | von Moller |
| 6,227,618 B1 | 5/2001 | Ligon, Sr. et al. |
| 6,338,530 B1 | 1/2002 | Gowing |
| 6,430,801 B1 | 8/2002 | Cosentino |
| 6,557,938 B1 | 5/2003 | Long |
| 6,595,585 B1 | 7/2003 | Mundell |
| 6,601,919 B1 | 8/2003 | Deceuninck |
| 6,619,739 B1 | 9/2003 | McMillen |
| 6,652,028 B1 | 11/2003 | McMillen |
| 6,652,029 B1 | 11/2003 | McMillen |
| 6,676,214 B1 | 1/2004 | McMillen et al. |
| 2003/0006636 A1 | 1/2003 | Ligon, Sr. et al. |
| 2003/0111884 A1 | 6/2003 | Dosen et al. |
| 2003/0111885 A1 | 6/2003 | McMillen |
| 2003/0173806 A1 | 9/2003 | McMillen |
| 2003/0227203 A1 | 12/2003 | Mundell |

* cited by examiner

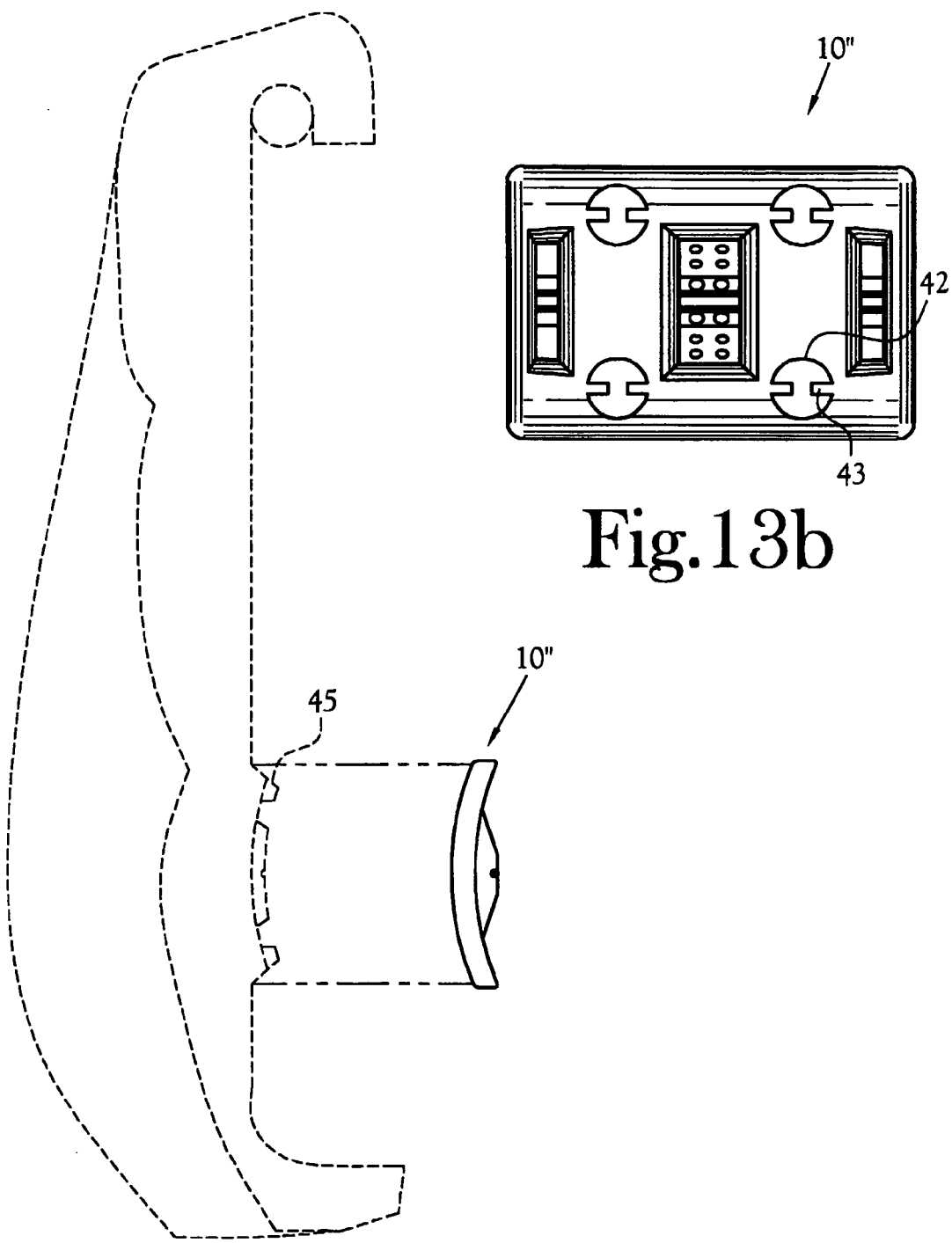

INTEGRATED ADJUSTABLE LUMBAR SUPPORT AND TRIM ATTACHMENT SYSTEM

CROSS-REFERENCE TO RELATED APPLICATIONS

This application claims the benefit of U.S. Provisional Application No. 60/304,504, filed Jul. 11, 2001.

STATEMENT REGARDING FEDERALLY SPONSORED RESEARCH OR DEVELOPMENT

Not Applicable

BACKGROUND OF THE INVENTION

1. Field of Invention

The present invention relates generally to seats, including vehicular seats. More particularly, the present invention relates to an insert for seats that provides adjustable lumbar support to a seat occupant.

2. Description of the Related Art

It is well-recognized that a person sitting in a seat for an extended time period may desire additional support to obtain greater seat comfort and/or alleviate seat discomfort. Vehicle operators, vehicle passengers, and people whose jobs require them to be seated for extended periods of time are typically chief among those individuals who seek such additional support The support is typically desired to provide greater comfort in the lower or the lumbar region of the back. As used herein, the term "seat" applies to a variety of seat structures, including chairs and vehicular seats.

The discomfort problem has been addressed in the prior art in several ways. A simple, although not complete, solution is to utilize a pillow placed low in the seat against the back thereof. By configuring the pillow into different shapes, a variation in lumbar support can be achieved. More permanent solutions to lumbar support problems have also been addressed, for example, in U.S. Pat. No. 5,076,643 issued to A. Colasanti, et al., on Dec. 31, 1993; and U.S. Pat. No. 5,190,348 issued to A. Colasanti on Mar. 2, 1993.

Both of the devices described in the '643 and '348 patents are of complex construction and require substantial time and cost for fabrication and installation. The requirements for the installation of a mounting plate, as well as the inter-securement of the bladder and plate elements, are primary reasons for the high cost, complexity of construction and the need of substantial time for the manufacture and installation of each device.

Other devices are also known in the art. Among these other devices are those disclosed in U.S. Pat. No. 4,567,615 issued to H. Fanti on Feb. 4, 1986, and U.S. Pat. No. 6,056,360, issued on May 2, 2000, to the predecessor in interest of the assignee of the present application, discloses a lumbar support system comprising unitary and divided leaf members. This device proved to be complicated and costly to manufacture.

It is also known, in the art of vehicular seats, that seat trim is attached to standard trim wires, which are typically molded in the seat back and cushion foam, which provide trim cover attachment points via mechanical fasteners such as hog rings. What is needed, and is missing from the art, is a lumbar support which is integral with a trim attachment array.

Accordingly, it is an object of the present invention to provide an adjustable lumbar support for seats that can be installed with a minimum of labor.

It is also an object of the present invention to provide an adjustable lumbar support that utilizes a floating plate that "self centers" or "self aligns" offering firm yet compliant support and that "moves" with the occupant.

It is another object of the present invention to provide an adjustable lumbar support which is regulable using different regulation mechanisms.

Further, it is an object of the present invention to provide an adjustable lumbar support which can be installed alone or in conjunction with a trim attachment array.

Still another object of the present invention is to provide a lumbar support that can be integral with a trim attachment array.

Yet another object of the present invention is to provide a lumbar support that is integral with a seat suspension.

These and other objects of the present invention will become apparent upon a consideration of the drawings referred to hereinafter, and a complete description thereof.

BRIEF SUMMARY OF THE INVENTION

An adjustable lumbar support mechanism, constructed in accordance with the present invention, is provided which provides advantages over the prior art. The adjustable lumbar support can be easily integrated into a seat structure either alone or in conjunction with an integral trim attachment array. The adjustable lumbar support includes a floating plate that "self centers" or "self aligns" offering firm yet compliant support and that "moves" with the occupant and is fully sprung, so as not to interfere with state of the art vibration insulation aspects of a seat, especially a vehicle seat. The floating support plate includes a curved front surface used to achieve lumbar support for a seat. The floating support plate is supported by a support linkage which includes first and second spring members that are engaged with the seat frame. The degree of lumbar support is adjusted by altering the effective length of the support linkage. A manual adjustment is provided for as well as a power adjustment. The powered embodiment is fully adaptable with "memory seating", wherein the memory function is provided by means of hall effect pulse counting of motor rotations or simple potentiometer based sensors as is readily known to those skilled in the art.

The integral trim attachment array of the present invention is adapted to replace the standard trim wires which are molded into the seat back and cushion foam of a standard, state-of-the-art vehicle seat The integral trim attachment array is defined by a trim ring having integrated pinch clips. The trim ring has a rectilinear configuration adapted to conform to the outline of a selected seat back or cushion foam. Linkages are provided for linking a plurality of trim rings together or for linking the trim ring to the floating support plate. Additionally, the floating support plate could be fashioned with integrated pinch clips to provide additional points of attachment for the seat trim. The pinch clips are adapted to secure the listing wires in the trim assembly to the face of the seat.

BRIEF DESCRIPTION OF THE SEVERAL VIEWS OF THE DRAWINGS

The above-mentioned features of the invention will become more clearly understood from the following detailed description of the invention read together with the drawings in which:

FIGS. 13A and 13B show an alternate embodiment of the lumbar support mechanism of the present invention for mounting the lumbar support mechanism to the foam cushion of a seat back.

DETAILED DESCRIPTION OF THE INVENTION

An adjustable lumbar support mechanism, constructed in accordance with the present invention, is illustrated generally as 10 in the figures. The adjustable lumbar support 10 provides a lumbar support mechanism which is adapted to be easily integrated into new or existing seat structures with minimal efforts and minimal costs. Moreover, in the preferred embodiment, the adjustable lumbar support 10 enables discrete regulation of the degree seat support provided to an individual's lumbar spine area and, thereby, maximizes the individual's comfort while occupying a seat. The lumbar support 10 includes a floating plate that "self centers" or "self aligns" offering firm yet compliant support and that "moves" with the occupant and is fully sprung, so as not to interfere with state of the art vibration insulation aspects of a seat, especially a vehicle seat.

Figure 11:
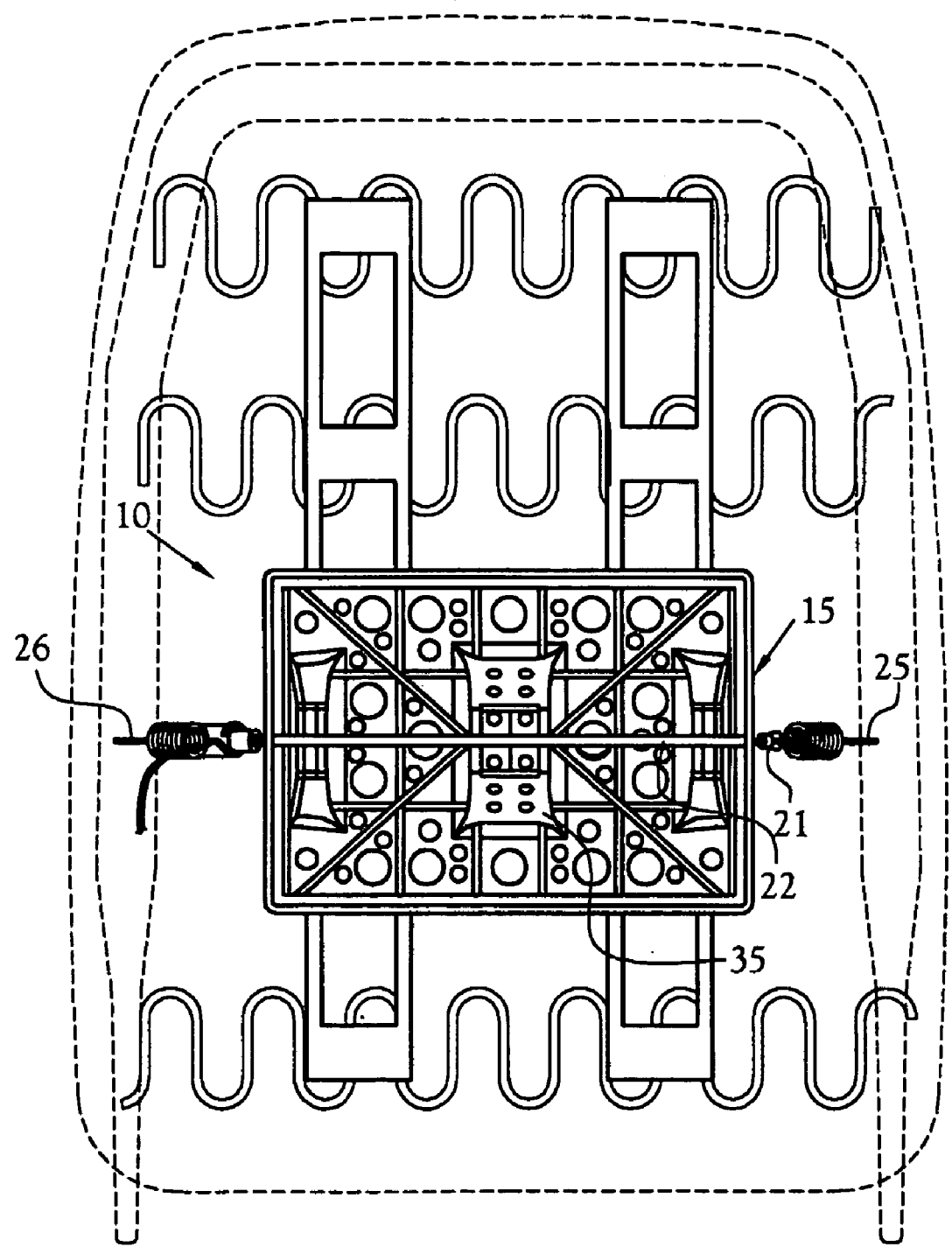
FIG. 11 is a rear elevation view illustrating the mounting of the lumbar support mechanism in a seat frame.
Figure 12A:
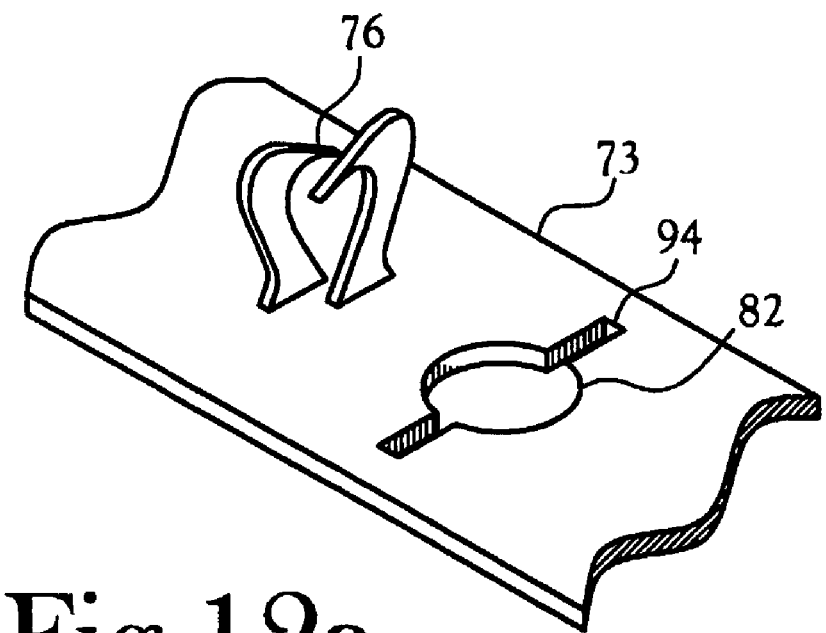
FIGS. 12A and 12B show perspective detail views of a portion of the trim ring showing a repair clip and a receptor for the repair clip.
Figure 12B:
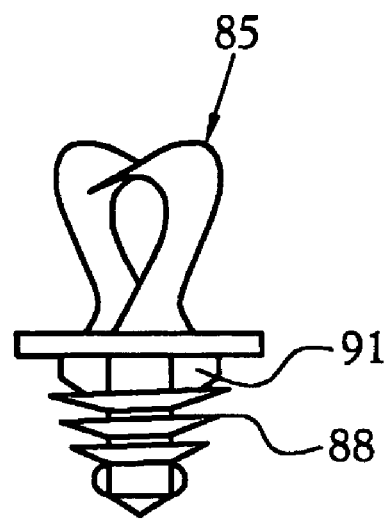

FIGS. 1–4 illustrate one configuration of a floating support plate 15 having a curved front surface 16 used to achieve lumbar support for a seat. In this embodiment, the floating support plate 15 is supported by a support linkage. The support linkage is positioned with respect to the floating support plate 15 so as to support the floating support plate 15 in a pivotal manner. In this manner the floating support plate is self centering and self aligns itself with the occupant's back. In this embodiment, the support linkage is defined by a cable member 21 and first and second spring members 25 and 26 which engage the seat frame, as best seen in FIG. 11. In this regard, the cable member 21 includes a terminal end which is secured to first spring member 25. Second spring member 26 is adapted to allow passage of the cable member 21 through the spring member 26 to a mechanism, such as handle 30 adapted for adjusting the amount of support provided by the floating support plate 15. It will be appreciated that the cable member 21 slides in a flexible guide tube 22 which serves as a cable housing.

Figure 1:
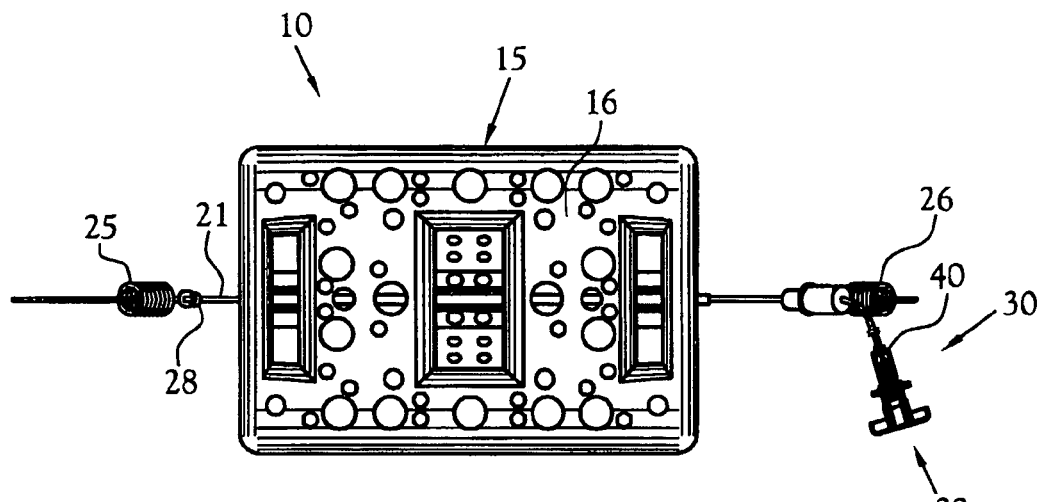
FIG. 1 is a front elevation view of the manually adjustable lumbar support mechanism of the present invention.
Figure 2:
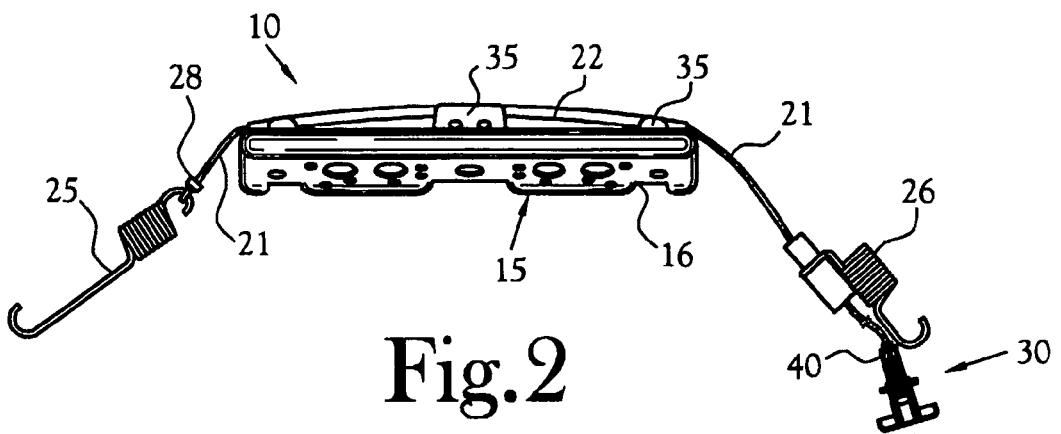
FIG. 2 is a top plan view of the manually adjustable lumbar support mechanism of the present invention showing the lumbar support mechanism in the retracted position, it being understood that the retracted position is the position that provides the least amount of lumbar support.
Figure 3:
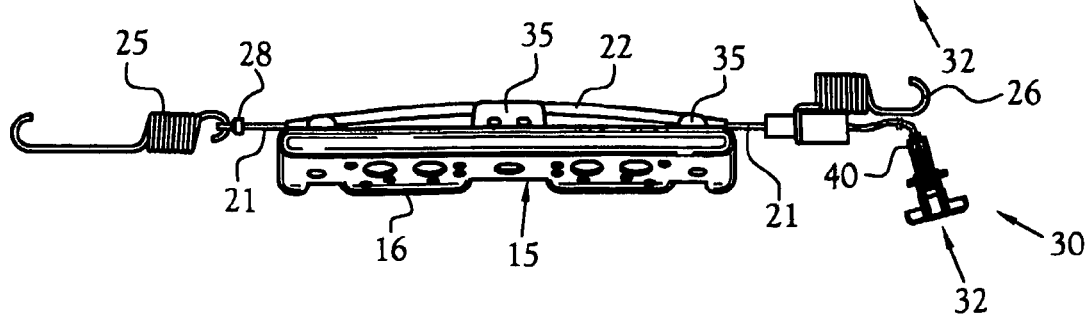
FIG. 3 is a top plan view of the manually adjustable lumbar support mechanism of the present invention showing the lumbar support mechanism in the extended position, it being understood that the extended position is the position that provides the greatest degree of lumbar support.
Figure 4:
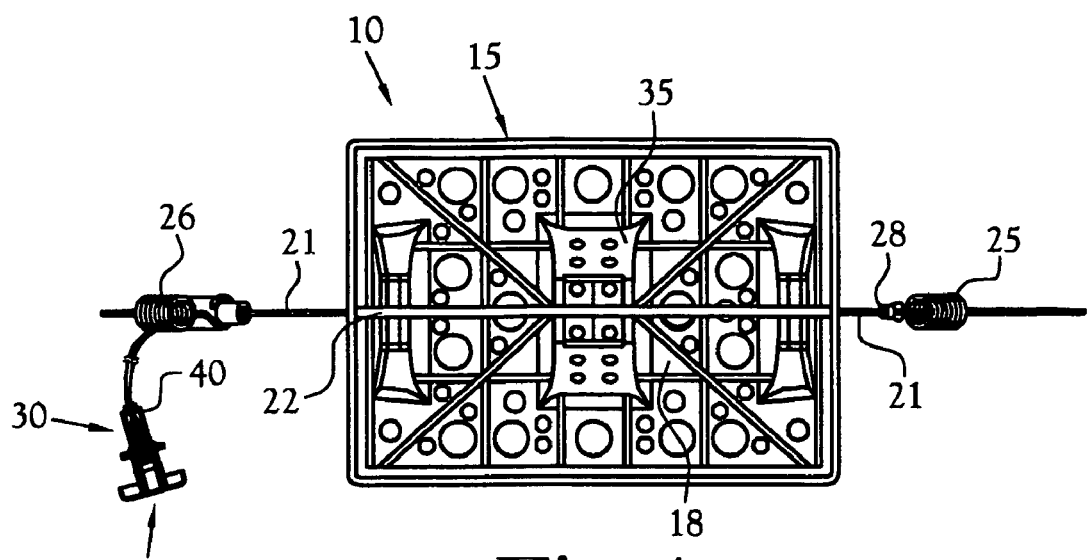
FIG. 4 is a rear elevation view of the manually adjustable lumbar support mechanism of the present invention.
Figure 5:
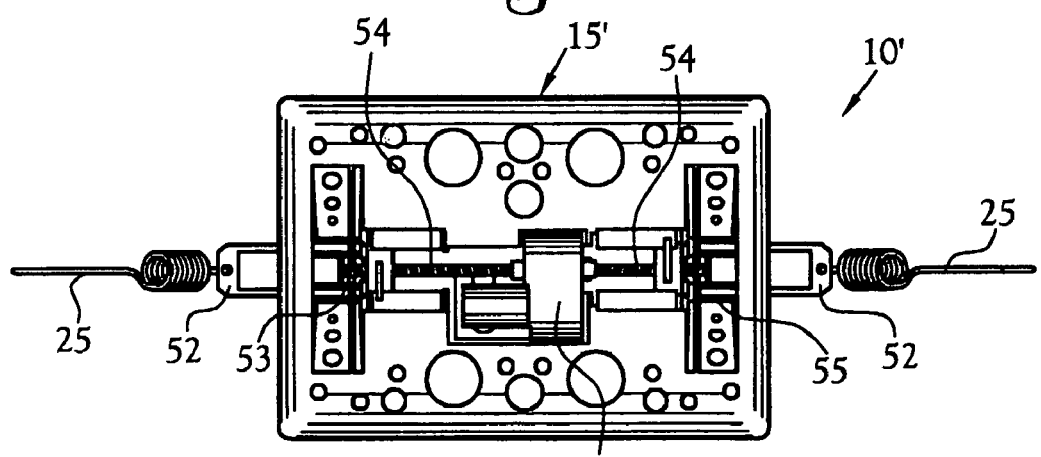
FIG. 5 is a front elevation view of an alternate embodiment of the adjustable lumbar support mechanism of the present invention which uses an electrically powered rotary mechanism for adjusting the lumbar support between the extended and retracted positions.
Figure 6:
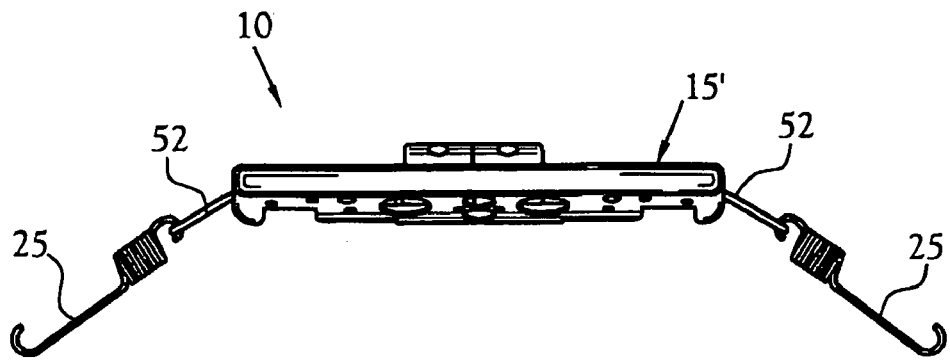
FIG. 6 is a top plan view of the electrically powered embodiment of the lumbar support mechanism of the present invention showing the lumbar support mechanism in the retracted position.

In this embodiment, the flexible guide tube 22 is secured to the rear surface 18 of the floating support plate 15. In the preferred embodiment, at least one projection 35 extends from the rear surface 18 of the floating support plate 15. The projection 35 preferably includes a groove 38 for receiving the flexible guide tube 22 in a manner that substantially secures the flexible guide tube 22 to the floating support plate 15. In this manner, the floating support plate 15 floats on the cable member 21 and the cable member 21 is allowed to slide freely through the flexible guide tube 22. Alternatively, a conduit for the cable member 21 could be integral with the floating support plate 15. The amount of lumbar support provided by the floating support plate 15 is determined by the effective length of the support linkage defined by the length of the cable member 21 disposed between the first and second spring members 25 and 26. In this regard, an actuator mechanism 30, adapted to apply and release force, is fixed to the cable member 21. For instance, a manual control handle 32 could be utilized. In this regard, the handle 32 receives the second end 40 of the cable member 21 such that rotation of the handle 116 moves the cable member 21 within the flexible guide tube 22, either shortening or lengthening the effective length of the cable 21 between the first and second spring members 25 and 26. As can be seen in FIGS. 2 and 3, as the effective length of the cable member 21 between the first and second spring members 25 and 26 is shortened, the degree of lumbar support provided by the floating support plate 15 is increased. Other manual or motorized actuators are foreseeable, as well. For instance, the cable can be motor driven. Alternatively, a direct drive strap system could be utilized, thus eliminating the need for a remote driven cable.

Typically the floating support plate 15 is, preferably, fabricated from a substantially rigid material such as plastic. The floating support plate 15 could also be flexible to offer more resilient support. Of course, those skilled in the art will recognize that the curved support member could be fabricated from other rigid, preferably lightweight, materials, such as composites or metals. Also, while the figures illustrate a plurality of cutouts disposed in the upper curved surface 16 of the floating support plate 15, which are provided for weight reduction, it will be appreciated that the upper curved surface 16 could be substantially solid.

The floating plate can float or be fixed to the foam directly. In this regard, as seen in FIGS. 13A and 13B, an alternate embodiment of floating support plate, illustrated as 10" is provided with a plurality of notches 42 disposed in the front surface 16 having at least a pair of inward projecting tabs 43. In this regard, the inward projecting tabs 43 are adapted to "pinch" projections 45, which are molded in the back of the foam which forms the seat cushion. Further, the floating support plate 15 could be molded into the seatback foam cushion. Other mechanisms for holding the floating support plate 15 will be discussed in greater detail below.

Figure 7:
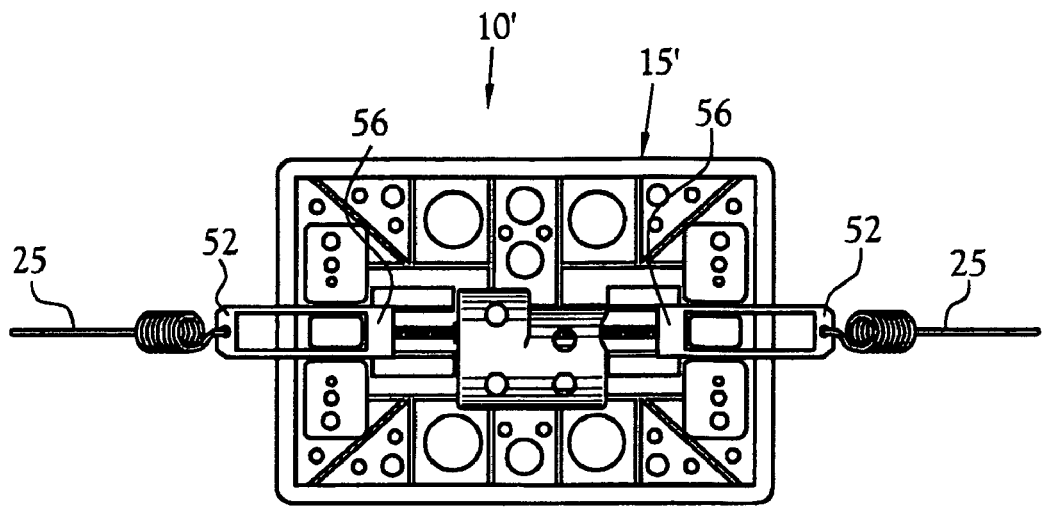
FIG. 7 is a rear elevation view of the electrically powered embodiment of the lumbar support mechanism of the present invention showing the lumbar support mechanism in the extended position.
Figure 8:
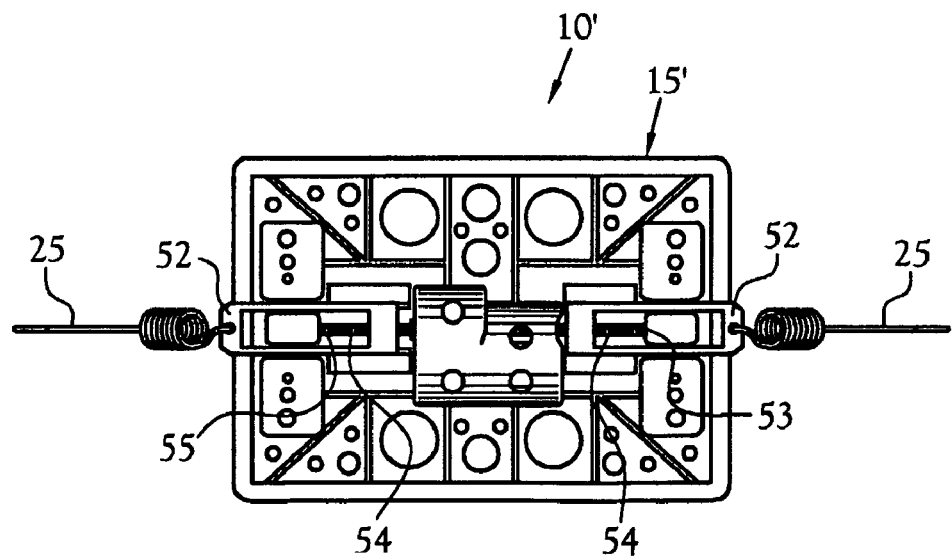
FIG. 8 is a rear elevation view of the electrically powered embodiment of the lumbar support mechanism of the present invention.

FIGS. 5–8 illustrate an alternate embodiment of the lumbar support mechanism 10' which includes floating support plate 15' which is actuated by an electrically powered rotary power mechanism 50. In this powered embodiment, the support linkage is defined by first and second spring members 25 engaged with first and second linkage members 52, respectively. The rotary power mechanism 50 applies rotating motion to a shaft 54 that is threaded on opposite ends 53, 55. One end is provided with a right hand thread and the other end is provided with a left hand thread. First and second linkage members 52 include threaded nuts 56 which engage the ends 53 and 55 of the shaft 54. Rotation of the shaft in a first direction will draw the first and second linkage members 52 inward, thus shortening the effective length of the support linkage as seen in FIG. 8. Contrariwise, rotation of the shaft 54 in the opposite direction will move the first and second linkage members 52, outward, thus lengthening the effective length of the support linkage as illustrated in FIG. 7. The rotary power mechanism 50 may require a shut-off switch depending upon the gear ratios and stall forces as will be readily recognized by those skilled in the art. It will be appreciated by those skilled in the art that both the manual embodiment and the powered embodiment are fully modular. Additionally, those skilled in the art will readily appreciate that the powered embodiment is fully adaptable with "memory seating", wherein the memory function is provided by means of hall effect pulse counting of motor rotations or simple potentiometer based sensors as is readily known to those skilled in the art.

Figure 9:
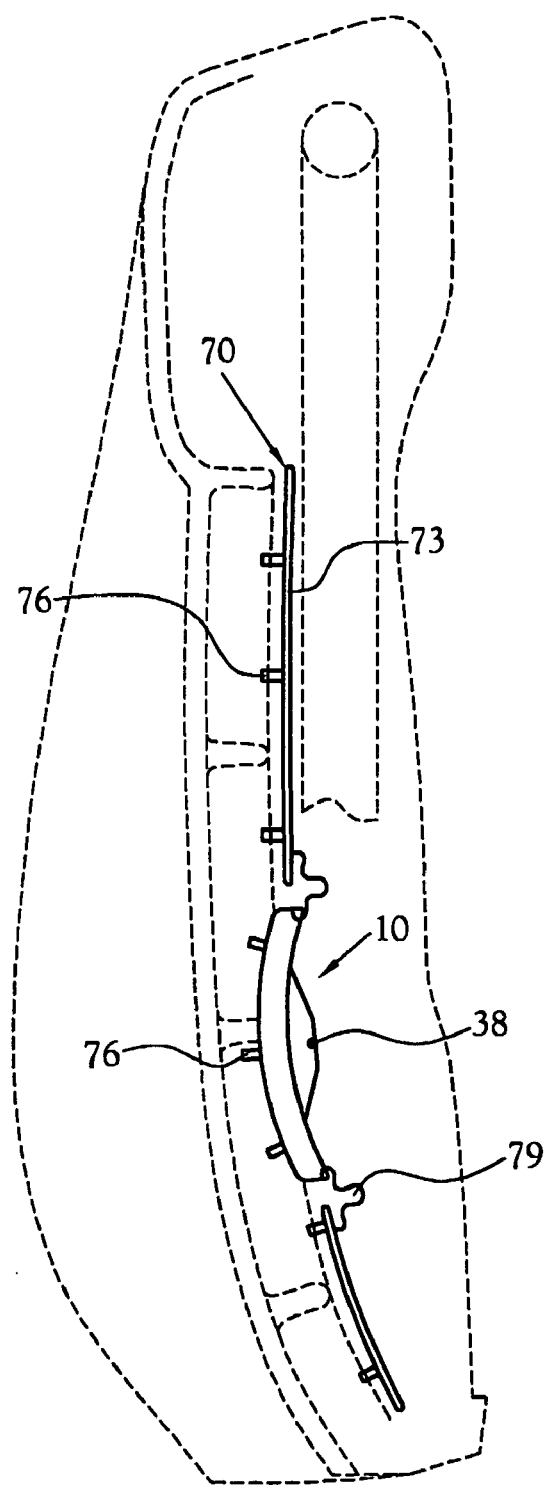
FIG. 9 is a side elevation view of the lumbar support mechanism of the present invention, along with the integrated trim attachment system positioned within a typical seatback cushion (shown in phantom).
Figure 10:
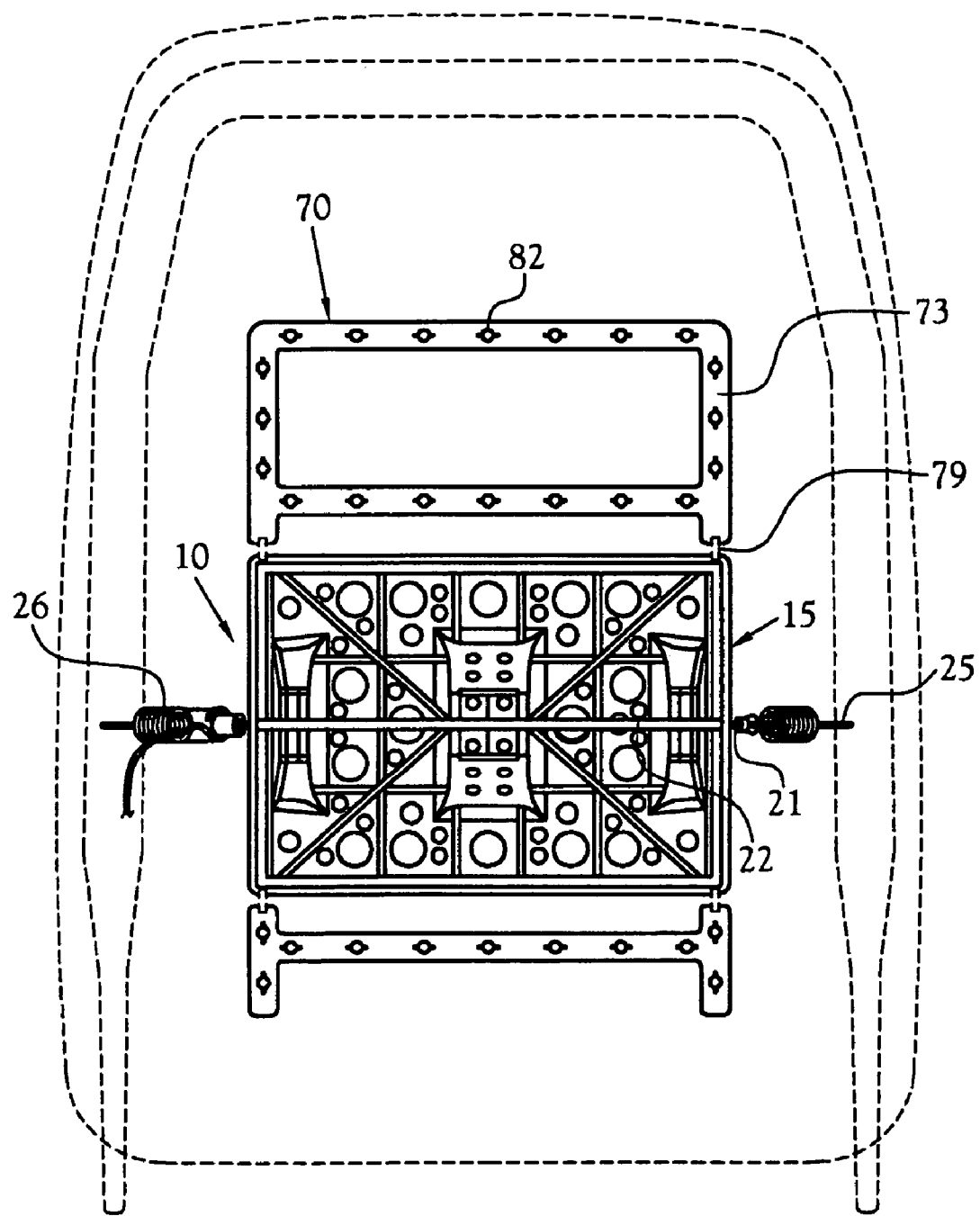
FIG. 10 is a rear elevation view of the lumbar support mechanism and integrated trim attachment system shown in FIG. 9.

While the lumbar support mechanism 10 or 10' can be mounted in a state of the art seat back and suspension, as illustrated in FIG. 11, it can also be mounted alone. Additionally, the lumbar support mechanism 10 and 10' can also be mounted in conjunction with an integral trim attachment array 70 as illustrated in FIGS. 9 and 10. In this regard, the integral trim attachment array 70 of the present invention is adapted to replace the standard trim wires which are molded into the seat back and cushion foam of a standard, state-of-the-art vehicle seat. The integral trim attachment array 70 is defined by a trim ring 73 having integrated pinch clips 76. The trim ring preferably has a rectilinear configuration adapted to conform to the outline of a selected seat back or cushion foam. The trim ring 73 is, preferably, molded into the seat back or cushion foam as will be understood by those skilled in the art Linkages 79 are utilized to link a plurality of trim rings 73 together or to link trim ring 73 to the floating support plate 10 as shown in FIGS. 9 and 10. Additionally, the floating support plate could be fashioned with integrated pinch clips 76 to provide additional points of attachment for the seat trim (not shown). The pinch clips 76 are adapted to secure the listing wires in the trim assembly to the face of the seat.

The system of the present invention integrates the trim attachment array 70 and the lumbar support mechanism 10 and thus allows the lumbar support mechanism 10 to be molded into the seat back foam. This creates certain unexpected advantages. Namely, molding the lumbar support mechanism 10 into the foam allows for deeper foam at the highest point of pressure on the occupants back. Additionally, the integration of the foam and the trim attachment array 70 yields a cleaner appearance of the seat back and also creates a more subtle contouring of the lumbar support with the seatback thus creating a cleaner appearance and also creating a more gradual shape change in the back rather than an abrupt support sensation, thereby being more transparent to the occupant of the seat. As seen in greater detail in FIG. 13, the trim ring also includes a plurality of repair hole members 82 which are adapted for receiving a repair pinch clip 85. The repair pinch clip 85 includes flanges 88 as are known in the art to substantially impede removal of the repair pinch clip 85 from the repair hole member 82. The repair pinch clip 85 also includes a key 88 which cooperates with a keyway 94, disposed in the repair hole member 82 so as to substantially prevent rotation of the repair pinch clip 85 within the repair hole member 82. It will be appreciated by those skilled in the art that this combination of repair hole members 82 and repair pinch clips 85 facilitates rapid repair of an inadvertently broken integrated pinch clip 76 during the assembly process.

From the foregoing description, it will be recognized by those skilled in the art that an improved lumbar support mechanism, and an integrated trim attachment system, have been provided. In this regard, the present invention provides an adjustable lumbar support for seats which is regulable using different regulation mechanisms, such as manual regulation mechanisms and power mechanisms. Further, the present invention provides a floating plate that "self centers" or "self aligns" offering firm yet compliant support and that "moves" with the occupant and which is fully sprung, so as not to interfere with state of the art vibration insulation aspects of a seat, especially a vehicle seat. It will be appreciated that this configuration alleviates the pressure on the user's lower back and kidney region associated with some conventional lumbar supports. Additionally, the present invention provides a trim attachment array that reduces the need for trim wires to be molded into the seat foam and further eliminate the need for secondary fasteners, such as hog rings.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept

Having thus described the aforementioned invention, we claim:

1. An adjustable lumbar support for seats, said adjustable lumbar support comprising:

a floating support plate for providing support to a lumbar region of a seat, said support plate having an front surface and a rear surface;

a support linkage for supporting said floating support plate, wherein said support linkage is adapted for engaging a seat frame, said support linkage having an effective length and including at least one spring member disposed between said floating support plate and the seat frame, said support linkage supporting said floating support plate in a pivotal manner; and an actuator mechanism for adjusting said effective length of said support linkage, whereby an amount of lumbar support provided by said floating support plate is increased as said effective length of said support linkage is decreased;

wherein said adjustable lumbar support is in active cooperation with an integral trim attachment array comprising a trim ring having integrated pinch clips disposed along a length of said trim ring, said trim ring including a plurality of repair hole members adapted for receiving a repair pinch clip, wherein said repair hole member includes at least one keyway and said repair pinch clip includes at least one key wherein said key and said keyway coact to substantially prevent rotation of said repair pinch clip within said repair hole member.

2. The adjustable lumbar support of claim 1 wherein said floating support plate has a curved front surface.

3. The adjustable lumbar support of claim 1 wherein said actuator mechanism is manually activated.

4. The adjustable lumbar support of claim 1 wherein said actuator mechanism is electrically powered.

5. The adjustable lumbar support of claim 1 wherein said actuator mechanism applies rotating motion to a shaft having first and second ends wherein said first and second ends are oppositely threaded.

6. The adjustable lumbar support of claim 1 wherein said floating support plate is constructed of a substantially rigid material.

7. The adjustable lumbar support of claim 1 wherein said support linkage is defined by a cable member and first and second spring members, wherein said spring members are adapted for engaging a seat frame, wherein said cable member has a first end secured to said actuator mechanism and a second end secured to one of said spring members, said cable member slides in a cable housing secured to said rear surface of said floating support plate.

8. The adjustable lumbar support of claim 7 wherein said cable housing is integral with said floating support plate.

9. The adjustable lumbar support of claim 1 wherein said floating support plate includes a projection disposed from said rear surface of said floating support plate.

10. An adjustable lumbar support for seats, said adjustable lumbar support comprising
a unitary floating support plate for providing support to a lumbar region of a seat, said unitary floating support plate having a front surface and a rear surface, said floating plate defining a plurality of apertures disposed in said front surface, each of said apertures including at least one inward projecting tab, said inward projecting tabs being adapted for receiving a projection molded in a foam cushion whereby said floating plate can be fixed to the foam cushion;
a support linkage for supporting said floating support plate such that said floating support plate self aligns with a lumbar region of a seat occupant, said support linkage having an effective length whereby an amount of lumbar support provided by said floating support plate is increased as said effective length of said support linkage is decreased, wherein said support linkage is defined by first and second spring members engaged with first and second linkage members respectively, wherein said first and second spring members are adapted to further engage a seat frame and further wherein said first and second linkage members include threaded fasteners; and
an actuator mechanism for adjusting said effective length of said support linkage, wherein said actuator mechanism is a powered mechanism for providing rotary motion to a shaft having first and second ends, said first and second ends of said shaft being oppositely threaded and said threaded fastener of said first linkage member being threadably engaged with said first end of said shaft and said threaded fastener of said second linkage member being threadably engaged with said second end of said shaft such that rotation of said shaft in a first direction draws said first and second linkage members inward thereby shortening said effective length of said support linkage, and rotation of said shaft in a second direction moves said first and second linkage members outward thereby increasing said effective length of said support linkage.

11. An adjustable lumbar support for seats, said adjustable lumbar support comprising:
a unitary floating support plate for providing support to a lumbar region of a seat, said support plate having a curved front surface and a rear surface, said floating support plate further having a projection disposed from said rear surface of said floating support plate;
a support linkage for supporting said floating support plate, wherein said support linkage is adapted for engaging a seat frame, said support linkage having an effective length and including at least one spring member disposed between said floating support plate and the seat frame, said support linkage supporting said floating support plate in a pivotal manner; and
an actuator mechanism for adjusting said effective length of said support linkage, whereby an amount of lumbar support provided by said floating support plate is increased as said effective length of said support linkage is decreased;
wherein said adjustable lumbar support is in active cooperation with an integral trim attachment array comprising a trim ring having integrated pinch clips disposed along a length of said trim ring, said trim ring defining a plurality of repair hole members adapted for receiving a repair pinch clip, wherein said repair hole member includes at least one keyway and said repair pinch clip includes at least one key wherein said key and said keyway coact to substantially prevent rotation of said repair pinch clip within said repair hole member.

* * * * *